(12) United States Patent
Kallio et al.

(10) Patent No.: US 6,316,556 B1
(45) Date of Patent: Nov. 13, 2001

(54) HOMOGENEOUS OLEFIN POLYMERIZATION CATALYST COMPOSITION

(75) Inventors: Kalle Kallio, Vanhakylä; Hilkka Knuuttila, Porvoo; Jyrki Kauhanen, Helsinki, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/355,308

(22) PCT Filed: Jan. 27, 1998

(86) PCT No.: PCT/FI98/00077

§ 371 Date: Oct. 1, 1999

§ 102(e) Date: Oct. 1, 1999

(87) PCT Pub. No.: WO98/32776

PCT Pub. Date: Jul. 30, 1998

(30) Foreign Application Priority Data

Jan. 28, 1997 (FI) .......................................................... 970349
Apr. 14, 1997 (FI) .......................................................... 971565
May 27, 1997 (FI) .......................................................... 972230

(51) Int. Cl.[7] ................................ C08F 4/58; C08F 4/16; B01J 31/38
(52) U.S. Cl. .......................... 526/127; 526/160; 526/943; 502/104; 502/117; 502/152
(58) Field of Search .................................. 526/160, 943, 526/127, 348; 502/104, 152, 117

(56) References Cited

U.S. PATENT DOCUMENTS 5,006,500   4/1991   Chang .

FOREIGN PATENT DOCUMENTS

| A30363029 | 4/1990 | (EP) . |
|---|---|---|
| A10384171 | 8/1990 | (EP) . |
| A10582195 | 2/1995 | (EP) . |
| A20643078 | 3/1995 | (EP) . |
| A20670325 | 9/1995 | (EP) . |
| A10737694 | 10/1996 | (EP) . |
| A30748822 | 12/1996 | (EP) . |
| 9105810 | 5/1991 | (WO) . |
| 9623006 | 8/1996 | (WO) . |
| 9627621 | 9/1996 | (WO) . |

OTHER PUBLICATIONS

Nasman et al., Isospecific Propylene Polymerization with a Novel 2–Substituted Bis(indenyl)ansa–Zirconcene, Organometallics 1996, 15 2450–2453, 1996.*

Reko Leino, et al, Organometallics 1996, vol. 15, No. 10, pp. 2450–2453.

* cited by examiner

Primary Examiner—David W. Wu
Assistant Examiner—R. Harlan
(74) Attorney, Agent, or Firm—Birch Stewart Kolasch Birch, LLP

(57) ABSTRACT

The present invention relates to an olefin polymerization catalyst composition comprising a metallocene and an aluminoxane containing alkyl groups with at least two (2) carbon atoms which provides more uniformity than methylaluminoxane, offers greater control and reproducibility of olefin polymerization and greater storage stability. The present invention also provides a method for the preparation of the olefin polymerization catalyst composition.

38 Claims, No Drawings

HOMOGENEOUS OLEFIN POLYMERIZATION CATALYST COMPOSITION

This application is the national phase under 35 U.S.C. §371 of PCT International Application No. PCT/FI98/00077 which has an International filing date of Jan. 27, 1998 which designated the United States of America. New homogeneous olefin polymerization catalyst composition The present invention relates to an olefin polymerization catalyst composition, in particular a composition comprising a metallocene and an aluminoxane or a reaction product thereof. The invention also relates to a process for preparing such an olefin polymerization catalyst composition and to the use of such an olefin polymerization catalyst composition for the polymerization of olefins.

In many olefin polymerization processes using a single site catalyst, homogeneous catalyst compositions based on a metallocene procatalyst and an aluminoxane cocatalyst have been used. By "homogeneous" is in this paper meant a dissolved or liquid catalyst, or a catalyst obtained by precipitation, evaporation or crystallization from solution or by solidification of liquid (e.g. melt).

According to S. Srinvasa Reddy, Polymer Bulletin, 36 (1996) 317–323, the polymerization activity of tetraisobutyldialuminoxane cocatalyst was clearly lower than the activity of methylaluminoxane cocatalyst. This reflects the prevailing general opinion, that only methyl aluminoxane as a cocatalyst gives satisfactory polymerization catalyst activities.

We have now surprisingly found that olefin polymerization may be carried out effectively using as a catalyst the combination of a metallocene and an aluminoxane other than methylaluminoxane where the metallocene contains a ring-substituted homo- or heterocyclic cyclopentadienyl sandwich ligand.

Thus viewed from one aspect the invention provides an olefin polymerization catalyst composition comprising a metallocene and an aluminoxane or a reaction product thereof, characterized in that said metallocene contains a ring-substituted homo- or heterocyclic cyclopentadienyl sandwich ligand and in that said aluminoxane contains alkyl groups containing at least two carbon atoms.

The catalyst composition of the invention is particularly advantageous since higher alkyl aluminoxanes, i.e. aluminoxanes containing alkyl groups containing at least 2 carbon atoms, may be prepared which are more uniform and more readily characterizable than methylaluminoxane, a material which is generally a mixture of several linear or cyclic structures. Use of more readily characterized aluminoxane co-catalysts offers the possibility of greater control and reproducibility of olefin polymerization. Also the storage stability of higher aluminoxanes is much better. The structure of the higher aluminoxanes will not change during storage, which is the case with MLAO.

The higher alkyl aluminoxane used according to the invention preferably contains $C_{2-10}$ alkyl groups. especially branched alkyl groups, e.g. ethyl, n-propyl, i-propyl, n-butyl, sec-butyl, tert-butyl, i-butyl, n-pentyl, iso-amyl, sec-amyl, tert-amyl, iso-hexyl, sec-hexyl, or tert-hexyl groups. Particularly preferably the higher alkyl aluminoxane contains $C_{3-6}$ alkyl groups, especially branched alkyl groups.

The metallocene used according to the invention preferably includes a catalytically active transition metal or lanthanide complexed by one or more, e.g. 1 or 2 homo- or heterocyclic cyclopentadienyl ligands. Where the metallocene contains more than one cyclopentadienyl ligand moiety, then a non ring-substituted cyclopentadienyl ligand moiety may be present. However it is preferred that all the cyclopentadienyl ligand moieties be ring-substituted.

Ring substitution may be for example by pendant groups (e.g. hydrocarbyl or hydrocarbyloxy groups optionally attached via heteroatoms such as O, N, S, P, Si or Ge or via multiply bonded carbon atoms), by fused rings (e.g. such as to produce fused bicyclic or polycyclic structures with 5- and 6 membered homo- or heterocyclic rings, which (other than one five membered ring) may be saturated or unsaturated, e.g. indenyl, tetrahydroindenyl, fluorenyl and octahydrofluorenyl groups), by bridging groups attached to the metal or to a second optionally ring-substituted homo- or heterocyclic cyclopentadienyl ring (for example with the linker moiety providing at least one backbone atom selected from carbon, silicon, oxygen, sulphur, nitrogen and phosphorus, e.g. being an alkylene or silylene bridge), or by combinations of such substituents, for example with bridging or pendant groups being attached to rings fused to the cyclopentadienyl ligand moiety rather than directly to the cyclopentadienyl ring.

The ring substituent(s) on the cyclopentadienyl ring are preferably such as to permit an extension to the π-electron system of the cyclopentadienyl ring, especially preferably such as to further disperse the negative charge on the ring; thus the ring is especially preferably substituted by π-electron withdrawing groups, e.g. polyatomic groups attached via heteroatoms such as O, S, N or P or via multiple bonded carbons.

The catalyst composition of the invention may comprise the metallocene and the higher alkyl aluminoxane either unreacted or more preferably as their reaction product. The metallocene, aluminoxane or metallocene:aluminoxane reaction product may if desired be on a particulate support, e.g. a porous inorganic or inorganic material (e.g. silica) or alternatively they may be in solution in an organic solvent. If desired, one of the metallocene and the aluminoxane may be on a particulate support with the other present as a solid, as a liquid or in solution. If desired the metallocene and aluminoxane may be brought into contact only in the olefin polymerization reactor or while being dosed into the reactor.

Viewed from a further aspect the invention provides the use of an aluminoxane containing alkyl groups containing at least two carbon atoms as a co-catalyst with a metallocene pro-catalyst containing a ring-substituted homo- or heterocyclic cyclopentadienyl sandwich ligand for the polymerization of an olefin.

Viewed from another aspect the invention provides the use of a metallocene containing a ring-substituted homo- or heterocyclic cyclopentadienyl sandwich ligand as a pro-catalyst with an aluminoxane co-catalyst containing at least two carbon atoms for the polymerization of an olefin.

Viewed from a still further aspect the invention provides the use as a catalyst for olefin polymerization of the reaction product of an aluminoxane containing alkyl groups containing at least two carbon atoms and a metallocene containing a ring-substituted homo- or heterocyclic cyclopentadienyl sandwich ligand.

Viewed from a yet still further aspect the invention provides a process for the preparation of an olefin polymerization catalyst, said process comprising contacting a metallocene pro-catalyst containing a ring-substituted homo- or heterocyclic cyclopentadienyl sandwich ligand with an aluminoxane containing alkyl groups containing at least two carbon atoms, preferably in an organic solvent or solvent mixture in which said metallocene and aluminoxane are soluble and optionally in the presence of a porous particulate support, and if desired recovering the reaction product of said metallocene and aluminoxane, preferably supported on said particulate support.

Viewed from a yet still further aspect the invention provides a method of olefin polymerization comprising contacting an olefin with a metallocene:aluminoxane catalyst composition, characterized in that as said catalyst composition is used a metallocene pro-catalyst containing a ring-substituted homo- or heterocyclic cyclopentadienyl sandwich ligand and an aluminoxane co-catalyst containing alkyl groups containing at least two carbon atoms or the reaction product thereof.

Thus using the present invention one may replace MAO as the olefin polymerization co-catalyst in homogeneous catalyst compositions. Moreover, using the present invention one may produce a homogeneous olefin polymerization catalyst composition suitable for use in gas phase, slurry phase or liquid/solution phase polymerizations.

In a preferred embodiment, the process of the invention involves contacting a) a metallocene of the general formula (1):

$$(C_pY_q)_mMX_nZ_o \qquad (1)$$

wherein Cp or each same or different Cp is one of a mono- or polysubstituted, fused or non-fused, homo- (=iso-) or heterocyclic cyclopentadienyl ligand, indenyl ligand, tetrahydroindenyl ligand, fluorenyl ligand, or octahydrofluorenyl ligand, Y or each same or different Y is a substituent at the cyclopentadienyl ring of said Cp ligand and is one of an —OR, —SR, —NR$_2$, —C(H or R)=, or —PR$_2$ radical, R or each same or different R being one of a substituted or unsubstituted C$_1$–C$_{16}$ hydrocarbyl group, a tri-C$_1$–C$_8$ hydrocarbylsilyl group, a tri-C$_1$–C$_8$ hydrocarbyloxy silyl group a mixed C$_1$–C$_8$ hydrocarbyl and C$_1$–C$_8$ hydrocarbyloxy silyl groups, a tri-C$_1$–C$_8$ hydrocarbyl germyl group, a tri-C$_1$–C$_8$ hydrocarbyloxy germyl group or a mixed C$_1$–C$_8$ hydrocarbyl and C$_1$–C$_8$ hydrocarbyloxy germyl group; M is a transition metal of Group 4 of the Periodic Table (IUPAC) and bound to the ligand or ligands Cp at least in an η$^5$ bonding mode; X or each same or different X is bound to M and is one of a hydrogen, a halogen, a substituted or unsubstituted C$_1$–C$_8$ hydrocarbyl group, a C$_1$–C$_8$ hydrocarbylheteroatom (O, S, N, P) group or a tri-C$_1$–C$_8$ hydrocarbyl silyl group or two X form together with M a C$_4$–C$_{20}$ metallocyclic ring structure; Z is a bridge atom or group between two Cp ligands or between one Cp ligand and the transition metal M; q is, when Cp is unbridged, 0–5 for Cp=cyclopentadienyl, 0–3 for Cp=indenyl or tetrahydroindenyl and 0–1 for Cp=fluorenyl or octahydrofluorenyl, or q is, when Cp is bridged, 0–4 for Cp=cyclopentadienyl, 0–2 for Cp=indenyl or tetrahydroindenyl and 0 for Cp=fluorenyl or octahydrofluorenyl; m is 1 or 2; m·q≧1; o is 0 or 1; and n is 4-m-o, except when there is a bridge Z between two Cp ligands, in which case n is 4-m, and b) an aluminoxane of one of the following formulas (2):

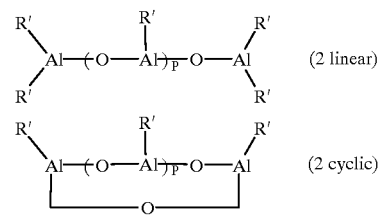

(2 linear)

(2 cyclic)

$$(OAIR')_p \qquad (2\text{general})$$

wherein each R' is the same or different and is a C$_2$–C$_{10}$ alkyl group; and p is an integer between 1 and 40, and c) an organic solvent which dissolves said metallocene and said aluminoxane or a reaction product of them, and recovering said homogeneous olefin polymerization catalyst composition.

By mono- or polysubstituted is meant that, in addition to said substituent Y, there may optionally be other substituents at the rings at said ligand or ligands Cp.

By fused or non-fused is meant that any ring at said ligands may be fused or non-fused, i.e. have at least two atoms in common, with at least one further ring.

By homo- and heterocyclic is meant that any ring of said ligands may have only carbon ring atoms (homo- or isocyclic) or may have other ring atoms (e.g. O, N, S, P) than carbon (heterocyclic).

It has thus been realized that a C$_2$–C$_{10}$ alkyl aluminoxane (i.e. a non-methyl aluminoxane) can successfully be used as the cocatalyst, if a metallocene having a —OR', —SR', —NR'$_2$, —C(H or R')=, or —PR'$_2$ substituent at the cyclopentadienyl ring is used as the procatalyst.

According to a non-limiting explanation, an electron pair of the heteroatom (O, S, N, P) or double bond substituents at the cyclopentadienyl ring delocalize it's negative charge and help to ionise the metallocene, whereby the transition metal M becomes more cationic (electron density deficient). This improves the catalytic interaction between the metallocene and the aluminoxane and enables the use of higher aluminoxanes like those of the above formula (2). A commercially acceptable homogeneous catalyst composition is the result.

According to a preferred embodiment of the invention, the cyclopentadienyl ring is substituted by an organic oxy radical, i.e. Y in the above formula (1) is an —OR radical. According to another preferred embodiment of the invention, the group R of the radical —OR, —SR, —NR$_2$, —CR= or —PR$_2$ is a tri-C$_1$–C$_8$ hydrocarbyl silyl group.

According to the process of the present invention said support is contacted with a metallocene of the general formula (1). It is preferred that the metallocene of the general formula (1) as group R of said substituent Y has a tri-C$_1$–C$_8$ hydrocarbyl silyl or a tri-C$_1$–C$_8$ hydrocarbyloxy silyl group which are capable of a interaction with said O, S, N, or P atoms of Y. Most preferred are tri-C$_1$–C$_8$ alkyl silyl groups, wherein at least one of the C$_1$–C$_8$ alkyls is a branched C$_3$–C$_8$ alkyl group such as isopropyl, isobutyl, sec-butyl, tert-butyl isoamyl, sec-amyl, tert-amyl, isohexyl, sec-hexyl, or tert-hexyl. Cyclic alkyls and aryls are also preferred groups of the silicone atom.

According to one embodiment of the invention there is only one ligand Cp in the metallocene of formula (1), which preferably is bound to the transition metal M by both said η$^5$ bond and by a bridge Z preferably containing a heteroatom such as an N bridge.

However, said metallocene of the general formula (1) has most preferably two ligands Cp, i.e. m is 2. According to a still more preferred embodiment, the two Cp ligands are bridged with each other by a bivalent atom or group Z having at least one chain atom which is one of a carbon, silicon, oxygen, sulphur, nitrogen, or phosphorous atom. Most preferably, the metallocene of the general formula (1) has m=2, whereby Z is an ethylene or a silylene bridge.

The transition metal M of group 4 of the Periodic Table in the general formula (1) is Ti, Zr or Hf, more preferably Zr or Hf, and most preferably Zr. The valency or oxidation number of M is 4.

The preferable atom or group X of said metallocene of formula (1) is a halogen atom and/or a $C_1$–$C_8$ hydrocarbyl group. Most preferably, X is chlorine and/or methyl. The number of X atoms or groups, i.e. "n", is preferably 1–3, most preferably 2, considering the limitation given above for the case when Z is a bridge between Cp and M.

Particularly preferred metallocenes of the general formula (1) are compounds of following structural formula (3).

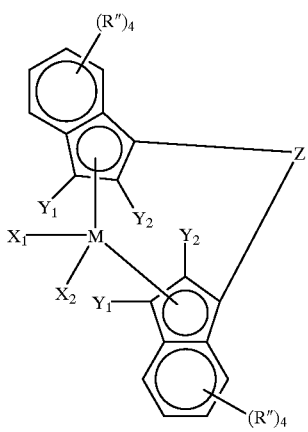

(3)

wherein each of the $Y_1$'s and $Y_2$'s is the same or different and is one of a hydrogen atom, a halogen atom, an acyl group, an acyloxy group, a substituted or unsubstituted $C_1$–$C_{10}$ hydrocarbyl group, an —OR, —SR, —NR, —C(H or R)=, or —PR$_2$ radical, R being one of a $C_1$–$C_{16}$ hydrocarbyl group or a tri-$C_1$–$C_8$-hydrocarbylsilyl group, provided that at least one of the $Y_1$'s and $Y_2$'s is one of said —OR, —SR, —NR, —C(H or R)=, or —PR$_2$ radicals; Z is a bivalent atom or group having at least one chain atom which is one of a carbon, silicon, oxygen, sulphur, nitrogen or phosphorus atom, preferably 1–4 carbon and/or silicon chain atoms; each R" is the same or different and is one of a hydrogen atom, a halogen atom, a $C_1$–$C_{10}$ hydrocarbyl group or ring constituent, or a $C_1$–$C_{10}$ hydrocarbyloxy group, M is one of Ti, Zr or Hf; and $X_1$ and $X_2$ are the same or different and are one of a halogen atom and a $C_1$–$C_8$ hydrocarbyl group. The analogous 4,5,6,7-tetrahydroindenyl derivatives are also useful in the invention.

Particularly preferable metallocenes of the formula (1) are ethylene-bis(2-tert-butyldimethylsiloxyindenyl)zirconium dichloride, ethylene-bis(2-tert-butyldimethylsiloxyindenyl) zirconium dimethyl, preferably ethylene-bis(2-tert-butyldimetyl(siloxy-indenyl)zirconium dimethyl, or their corresponding tetrahydroanalogues.

When using chiral metallocenes, they can be used as a racemate for the preparation of highly isotactic α-olefin polymers. The pure R or S form of said metallocene can also be used, e.g. for the production of optically active polymer.

The metallocene of the general formula (1) is usually prepared by a process involving repeated deprotonations/ metallizations of the aromatic ligands and introduction of the bridge Z atom or atoms as well as the central atom by their halogen derivatives. The preparation of the said metallocene of the general formula (1) can e.g. be carried out according to a J. Organometallic Chem. 288 (1958) 63–67 and EP-A-320762, both herewith incorporated by reference. See also Soares, J. B. P., Hamidec, A. E., Polym. Reaction Eng., 3 (2) (1995) 131–200, herewith incorporated by reference.

The most preferred metallocenes of the general formula (1), wherein the substituent Y is a tri-$C_1$–$C_8$ hydrocarbylsiloxy group, is preferably prepared as follows:

The catalyst compounds according to the invention can be prepared from 2- or 3-indanone. In the following, the preparation of 2-siloxy indene derivatives is described to exemplify the preparation of 2- and/or 3-siloxy indenes. 2-indanone can be reacted in a suitable solvent with a base and a chlorosilane to form 2-siloxyindene with a yield of over 80%. Suitable solvents are for example dimethylformamide (DMF) and tetrahydrofurane (THF). Suitable bases are for example imidazole and triethylamine (TEA). Suitable chlorosilanes are for example tertbutyldimethylchlorosilane, t-hexyldimethylchlorosilane and cyclohexyldimethylchlorosilane. The reaction takes place according to the following reaction scheme (II):

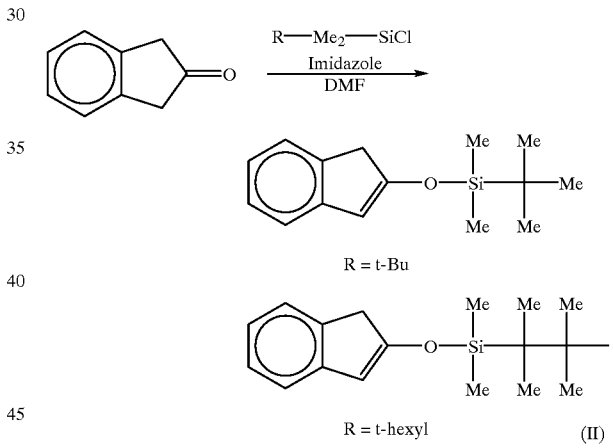

(II)

According to one embodiment of the invention 2-tert-butyldimethylsiloxyindene is reacted first with butyllithium and then with dimethyl dichlorosilane (Me$_2$SiCl$_2$) to form dimethylsilylbis(2-tert-butyldimethylsiloxyindene). Butyllithium can be replaced with methyllithium, sodium hydride or potassium hydride. Likewise dimethyl dichlorosilane can be replaced with any diaLkyl or diarylsilane. Silicon can be replaced with germanium.

Dimethylsilylbis(2-tert-butyldimethylsiloxyindene) can be reacted with butyllithium, which gives the corresponding bislithium salt. This product can be reacted with zirconium tetrachloride to yield dimethylsilylbis(2-tert-butyldimethylsiloxyindenyl)zirconium dichloride as a mixture of the racemic and meso diastereomers. Butyllithium may be replaced as described earlier. Zirconium tetrachloride can be replaced with titanium tetrachloride or hafiium tetrachloride to give the corresponding titanium and hafiium complexes. The reactions take place according to the following reaction schemes (III–IV):

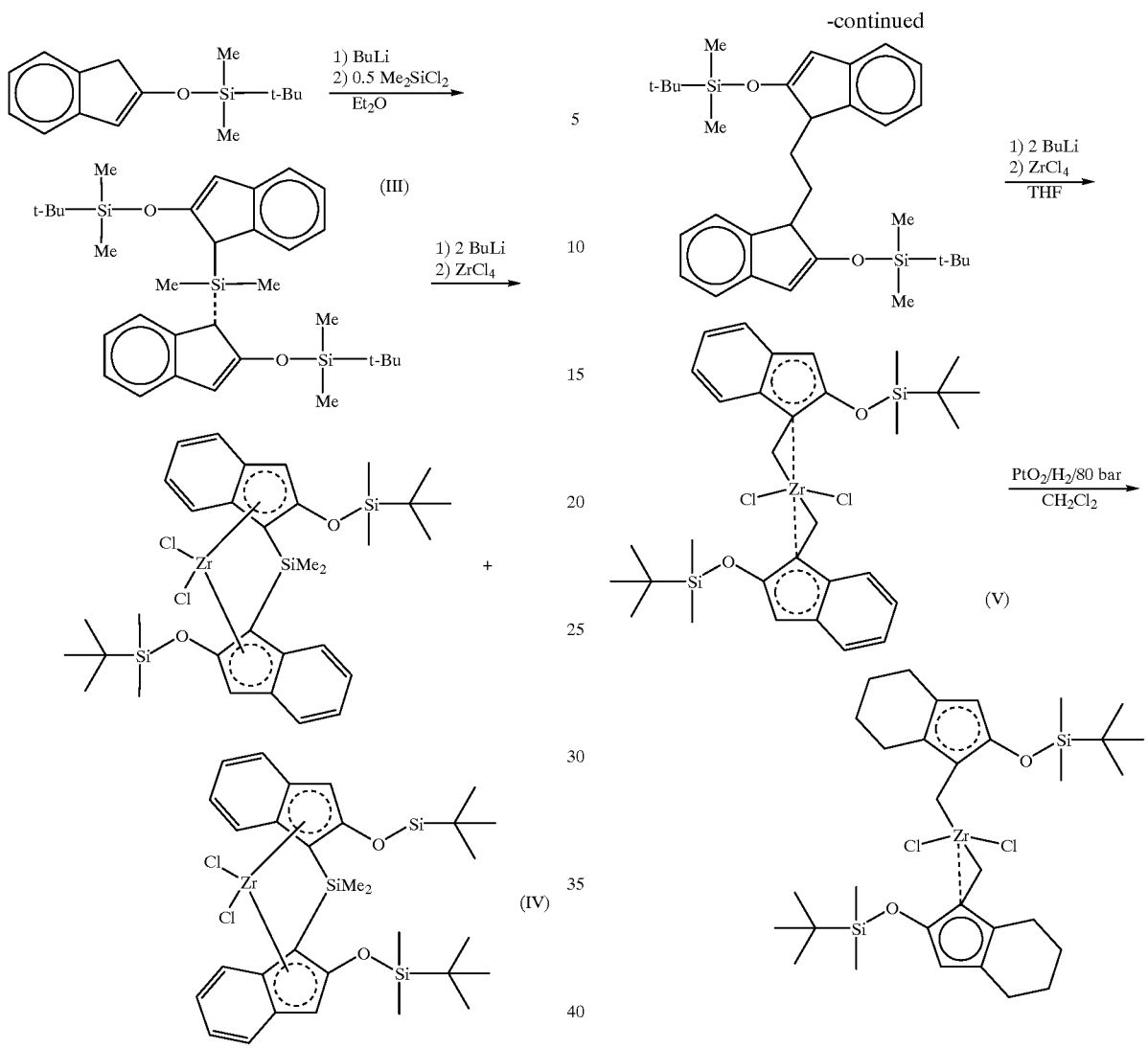

According to another embodiment of the invention 2-tert-butyldimethylsiloxyindene is reacted first with butyllithium and then with dibromoethane to form bis(2-tert-butyldimethylsiloxyindenyl)ethane. This compound can be reacted with two equivalents of butyllithium, which gives the corresponding bislithium salt. This can then be reacted with zirconium tetrachloride to yield ethylenebis(2-tert-butyldimethylsiloxyindenyl)zirconium dichloride. The racemic diastereomer of the latter is formed in great excess and is easily separated from the meso isomer by fractional crystallization. Catalytic hydrogenation of racemic ethylenebis(2-tert-butyldimethylsiloxyindenyl)zirconium dichloride yields the corresponding tetrahydroindenyl complex. The reaction takes place according to the following reaction scheme (V):

In the reactions above butyllithium may be replaced as described earlier. Zirconium tetrachloride can be replaced with titanium tetrachloride or hafiiium tetrachloride to give the corresponding titanium and hafnium complexes.

According to still another embodiment of the invention 2-t-hexyldimethylsiloxyindene is reacted first with butyllithium and then with dibromoethane to form bis(2-t-hexyldimethylsiloxyindenyl)ethane. This compound can be reacted with two equivalents of butyllithium which gives the corresponding bislithium salt. This can then be reacted with zirconium tetrachloride to yield ethylenebis(2-t-hexyldimethylsiloxyindenyl)zirconium dichloride. The racemic diastereomer of the latter is formed in great excess and is easily separated from the meso isomer by fractional crystallization. The reaction takes place according to the following reaction scheme (VI):

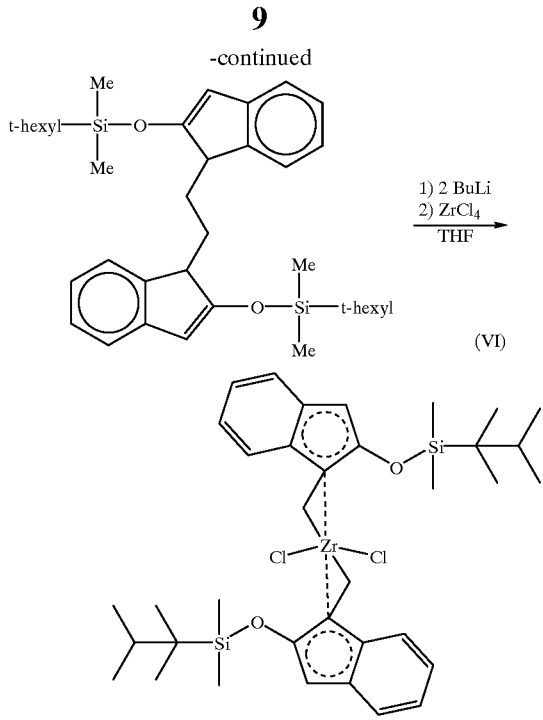

In the reactions above butyllithium may be replaced as described earlier. Zirconium tetrachloride can be replaced with titanium tetrachloride or hafiium tetrachloride to give the corresponding titanium and hafnium complexes. Hydrogenation of ethylenebis(2-t-hexyldimethylsiloxyindenyl) zirconium dichloride yields the corresponding tetrahydroindenyl complex.

Illustrative but non-limiting examples of the preferable compounds used according to the invention are, among others, racemic and meso dimethylsilylbis(2-tert-butyldimethylsiloxyindenyl)zirconium dichloride, racemic and meso diphenylsilylbis(2-tert-butyldimethylsiloxyindenyl)zirconium dichloride, racemic and meso dimethylsilylbis(2-t-hexyldimethylsiloxyindenyl) zirconium dichloride, racemic and meso diphenylsilylbis(2-t-hexyldimethylsiloxyindenyl)zirconium dichloride, racemic and meso dimethylsilylbis(2-cyclohexyldimethylsiloxyindenyl)zirconium dichloride, racermic and meso dimethylsilylbis(2-cyclohexyldimethylsiloxyindenyl)zirconium dichloride, racemic and meso dimethylsilylbis(2-2-tert-butyldiphenylsiloxyindenyl)zirconium dichloride, racemic and meso diphenylsilylbis(2-tert-butyldiphenylsiloxyindenyl)zirconium dichloride, racemic and meso dimethylsilylbis(2-tert-butyldimethylsiloxy-4,5,6,7-tetrahydroindenyl)zirconium dichloride, racemic and meso diphenylsilylbis(2-tert-butyldimethylsiloxy-4,5,6,7-tetrahydroindenyl)zirconium dichloride, racemic and meso dimethylsilylbis(2-t-hexldimethylsiloxy-4,5,6,7-tetrahydroindenyl)zirconium dichloride, racemic and meso diphenylsilylbis(2-t-hexyldimethylsiloxy-4,5,6,7-tetranydroindenyl)zirconium dichloride, racemic and meso dimethylsilylbis(2-cyclohexyldimethylsiloxy-4,5,6,7-tetrahydroindenyl)zirconium dichloride, racemic and meso diphenylsilylbis(2-cyclohexyldimethylsiloxy-4,5,6,7-tetrahydroindenyl)zirconium dichloride, racermic and meso dimethylsilylbis(2-tert-butyldiphenylsiloxy-4,5,6,7-tetrahydroindenyl)zirconium dichloride, racermic and meso diphenylsilylbis(2-tert-butylphenylsiloxy-4,5,6,7-tetrahydroindenyl)zirconium dichloride, rac-ethylenebis(2-tert-butylnethylsiloxyindenyl)zirconium dichloride, racemic and meso ethylenebis(2-t-hexyldimethylsiloxyindenyl) zirconium dichloride, racemic and meso ethylenebis(2-cyclohexyldimethylsiloxyindenyl)zirconium dichloride, racemic and meso ethylenebis(2-tert-butyldiphenylsiloxyindenyl)zirconium dichloride, rac-ethylenebis(2-tert-butyldimethylsiloxy-4,5,6,7-tetrahydroindenyl)zirconium dichloride, racemic and meso ethylenebis(2-cyclohexvsldimethylsiloxy-4,5,6,7-tetrahydroindenyl)zirconium dichloride, racernic and meso ethylenebis(2-tert-butyldiphenylsiloxy-4,5,6,7-tetrahydroindenyl)zirconium dichloride and rac-ethylenebis (2-t-hexyldimethylsiloxyindenyl)zirconiumn dichloride. Titanium or hafnium can be used instead of zirconium in corresponding complexes.

Particularly preferred bridged 3-(siloxy)indenyl and 3-(siloxy)-4,5,6,7-tetrahydroindenyl metallocenes according to the present invention include: rac- and meso-[ethylenebis(3-(tert-butyldimethylsiloxy)indenyl)] zirconium dichloride; rac- and meso-[dimethylsilylenebis(3-(tert-butyldimethylsiloxy)indenyl)]zirconium dichloride; rac- and meso-[ethylenebis(3-(t-hexyldimethylsiloxy) indenyl)]zirconium dichloride; rac- and meso-[dimethylsilylenebis(3-(t-hexyldimethylsiloxy)indenyl)] zirconium dichloride; rac- and meso-[ethylenebis(3-(tert-butyldimethylsiloxy)-4,5,6,7-tetrahydroindenyl)]zirconium dichloride; rac- and meso-[dimethylsilylenebis(3-(tert-butyldimethylsiloxy)-4,5,6,7-tetrahydroindenyl)]zirconium dichloride; rac- and meso-[ethylenebis(3-(t-hexyldimethylsiloxy)-4,5,6,7-tetrahydroindenyl)]zirconium dichloride and rac- and meso-[dimethylsilylenebis(3-(t-hexyldimethylsiloxy)-4,5,6,7-tetrahydroindenyl)]zirconium dichloride; and the same hafnium compounds such as: rac- and meso-[ethylenebis(3-(tert-butyldimethylsiloxy) indenyl)]hafnium dichloride; rac- and meso-[dimethylsilylenebis(3-(tert-butyldimethylsiloxy)indenyl)] hafnium dichloride; rac- and meso-[ethylenebis(3-(t-hexyldimethylsiloxy)indenyl)]hafnium dichloride; rac- and meso-[dimethylsilylenebis(3-(t-hexyldimnethylsiloxy) indenyl)]hafium dichloride; rac- and meso-[ethylenebis(3-(tert-butyldimethylsiloxy)-4,5,6,7-tetrahydroindenyl)] hafnium dichloride; rac- and meso-[dimethylsilylenebis(3-(tert-butyldimethylsiloxy)-4,5,6,7-tetrahydroindenyl)] hafnium dichloride; rac- and meso-[ethylenebis(3-(t-hexyldimethylsiloxy)-4,5,6,7-tetrahydroindenyl)]hafnium dichloride and rac- and meso-[dimethylsilylenebis(3-(t-hexyldimethylsiloxy)-4,5,6,7-tetrahydroindenyl)]hafnimn dichloride; and the like.

When contacting said metallocene of the general formula (1) or (3), the metallocene is preferably dissolved in a chlorinated or non-chlorinated $C_3$–$C_{10}$ hydrocarbon solvent and most preferably in an aromatic hydrocarbon solvent such as toluene.

In the present process for the preparation of a homogeneous olefin polymerization catalyst composition, the metallocene according to formula (1) or (3) is contacted with an aluminoxane of the general formulas (2). Formulas (2) are general formulas including not only linear and cyclic compounds, but also aluminoxane compounds of cage and net structures. See e.g. Harlan, et.al., J. Am Chem. Soc., 117, (1995) p. 6466, the aluminoxane structures of which are enclosed by reference to disclose one embodiment of the invention.

The aluminoxane used in the process of the present invention is preferably an aluminoxane (2), wherein said R' is a $C_3$–$C_{10}$ alkyl group, more preferably an isopropyl, isobutyl, sec-butyl, tert-butyl, isoamyl, sec-amyl, tert-amyl isohexyl, sec-hexyl or tert-hexyl group. The most preferred aluminoxane of the formula (3) is preferably an aluminoxane in which $2 \leq p \leq 12$, most preferably $4 \leq p \leq 8$. A suitable aluminoxane of the formula (2) is hexa(isobutylaluminiumoxane). The aluminoxane according to the present invention can be prepared analogously to or by modifying a variety of methods for preparing aluminoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, EP-A-0 561 476, EP-B1-0 279 586, EP-A-0 594 218 and WO 94/10180.

It is preferable to contact said metallocene of formula (1) or (3) previous to, immediately before, or at the beginning of the olefin polymerization, with an aluminoxane of formula (2) dissolved or immersed in a chlorinated or unchlorinated hydrocarbon solvent such as hexane or toluene. When contacting said metallocene of the formula (1) or (3) with said aluminoxane of the formula (2), the molar ratio between the aluminoxane aluminium metal and the metallocene transition metal in the catalyst composition is preferably between 20 and 2000, more preferably 50 and 1500 and most preferably between 100 and 1200. The concentration of metallocene in the catalyst composition is preferably regulated to between 0.01 and 100 mmol/l, more preferably to between 0.1 and 50 mmol/l, even more preferably to between 0.5 and 10 mmol/l, most preferably to between 1 and 5 mmol/l.

When preparing a supported olefin polymerization catalyst composition according to the present invention, the contacting product between the metallocene of the general formula (1) or (3) and the aluminoxane of the general formula (2) can be subjected to a prepolymerization with at least one olefin such as propylene and/or ethylene. The prepolymerizate is then recovered as said supported olefin polymerization catalyst composition. The process may also include a step of solidification (e.g. by precipitation, evaporation, crystallization) of said catalyst, whereby a homogeneous solid is obtained.

In addition to the above described process for the preparation of a homogeneous olefin polymerization catalyst composition, the present invention also relates to a homogeneous olefin polymerization catalyst composition which has been prepared according to said described process. The invention also relates to a process for polymerizing at least one olefin by polymerizing in the presence of said homogeneous olefin polymerization catalyst or a catalyst prepared according to the above described process. In the polymerization (homopolymerization or copolymerization) olefin monomers, such as ethylene, propylene, 1-butylene, isobutylene, 4-methyl-1-pentene, 3-methyl-1-butene, 4,4-dimethyl-1-pentene, vinylcyclohexene, 1-decene and their comonomers, can be used. Dienes and cyclic olefins can also be homo- or copolymerized. These α-olefins and other monomers can be used both in the polymerization and prepolymerization using the claimed supported olefin polymerization catalyst composition.

The polymerization can be a homopolymenization or a copolymerization and it can take place in the gas, slurry or a solution phase. The claimed catalyst composition can also be used in high pressure processes. Said α-olefins can be polymerized together with higher α-olefins in order to modify the properties of the final product. Such higher olefins are 1-hexene, 1-octene, 1-decene, etc.

In the following, the present invention is illustrated by non-limited examples.

COMPARATIVE EXAMPLES

Comparative Example 1

Preparation of the Complex Solution

A complex solution of metallocene was prepared by adding 34 mg of rac-ethylene-bis(2-tert-butyldimethylsiloxyindenyl)zirconiumdichloride into 20 ml moisture and oxygen free toluene. The final solution had a concentration of 2.5 μmol/ml (1.7 mg/ml). To form the metallocene/MAO (methyl aluminoxane) complex, 0.25 ml of said metallocene compound solution was added into 10 ml of additional toluene containing 0.11 ml of 30 w-% MAO. The final Al/Zr-ratio was 500.

Test Polymerization

A test polymerization was carried out in a 3-liter Büchi autoclave in n-pentane at 70° C. The ethylene partial pressure was 5 bar and the total pressure was 8.4 bar. Into the reactor, 10 ml of previously prepared complex solution was fed. The total amount of metallocene compound was 0.63 μmol (0.44 mg) and the Al/Zr-ratio was 500. After 30 min of polymerization the reaction was stopped by closing the ethylene feed and releasing the overpressure from the reactor. The yield of polymer was 73 g giving a total catalyst activity of 2540 kgPE/g*Zr*h.

Comparative example 2

Preparation of the Complex Solution

A complex solution of metallocene was prepared by adding 34 mg of rac-ethylene-bis(2-tert-butyldimethylsiloxyindenyl)zirconiumdichloride into 20 ml moisture and oxygen free toluene. The final solution had a concentration of 2.5 μmol/ml (1.7 mg/ml). To form the metallocene/MAO complex, 1.0 ml of metallocene compound solution was added into 10 ml of additional toluene containing 0.17 ml of 30 w-% MAO. The final Al/Zr-ratio was 200.

Test Polymerization

A test polymerization was carried out in a 3-liter Büchi autoclave in n-pentane at 70° C. The ethylene partial pressure was 5 bar and the total pressure was 8.4 bar. Into the reactor, 10 ml of previously prepared complex solution was fed. The total amount of metallocene compound was 2.5 μmol (1.7 mg) and the Al/Zr-ratio was 200. After 30 min the polymerization reaction was stopped by closing the ethylene feed and releasfin the overpressure from the reactor. The yield of polymer was 120 g giving a total catalyst actilvity of 1036 kgPE/g*Zr*h.

Comparative Example 3

Preparation of the Complex Solution

A complex solution of metallocene was prepared by adding 34 mg, of rac-ethylene-bis(2-tert-butyldimethylsiloxyindenyl)zirconiumdichloride into 10 ml moisture and oxygen free toluene. The fmnal solution had a concentration of 2.5 μmol/ml (1.7 mg/ml). To form a metallocene/MAO complex, 0.25 ml of the metallocene compound solution was added into 10 ml of additional toluene containing 0.02 ml of 30 w-% MAO. The final Al/Zr-ratio was 100.

Test Polymerization

A test polymerization was carried out in a 3-liter Büchi autoclave in n-pentane at 70° C. The ethylene partial pressure was 5 bar and the total pressure was 8.1 bar. Into the reactor, 10 ml of the previously prepared complex solution was fed. The total amount of metallocene compound was 0.63 μmmol (0.44 mg) and the Al/Zr-ratio was 100. After 30 min, the polymerization reaction was stopped by closing the ethylene feed and releasing the overpressure from the reactor. The yield of polymer was 12 g giving a total catalyst activity of 406 kgPE/g*Zr*h.

Comparative Example 4
Preparation of the Complex Solution

A complex solution of metallocene was prepared by adding 20.9 mg of rac-ethylene-bis(indenyl) zirconiumdichloride into 20 ml moisture and oxygen free toluene. The final solution had a concentration of 2.5 µmol/ml (1.045 mg/ml). To form a metallocene/MAO complex, 1.0 ml of the metallocene compound solution was added into 10 ml of additional toluene containing 0.43 ml of 30 w-% MAO. The final Al/Zr-ratio was 500.

Test Polymerization

A test polymerization was carried out in a 3-liter Büchi autoclave in n-pentane at 70° C. The ethylene partial pressure was 5 bar and the total pressure was 8.6 bar. Into the reactor 2.5 ml of the previously prepared complex solution was fed. The total amount of metallocene compound was 0.63 µmol (0.26 mg) and the Al/Zr-ratio was 500. After 30 min of polymerization the reaction wvas stopped by closing the ethylene feed and releasing the overpressure from the reactor. The yield of polymer was 25 g giving a total catalyst activity of 842 kgPE/g*Zr*h.

Comparative Example 5
Preparation of the Complex Solution

A complex solution of metallocene was prepared by adding 20.9 mg of rac-ethylene-bis(indenyl) zirconiumdichloride into 20 ml moisture and oxygen free toluene. The final solution had a concentration of 2.5 µmol/ml (1.045 mg/ml). To form a metallocene/MAO complex, 1.0 ml of the metallocene compound solution was added into 10 ml of additional toluene containing 0.17 ml of 30 w-% MAO. The final Al/Zr-ratio was 200.

Test Polymerization

A test polymerization was carried out in a 3-liter Büchi autoclave in n-pentane at 70° C. The ethylene partial pressure was 5 bar and the total pressure was 8.6 bar. Into the reactor, 2.5 ml of previously prepared complex solution was fed. The total amount of metallocene compound was 0.63 µmnol (0.26 mg) and the Al/Zr-ratio was 200. After 30 min the polymerization reaction was stopped by closing the ethylene feed and releasing the overpressure from the reactor. The yield of polymer was 27 g giving a total catalyst activity of 910 kgPE/g*Zr*h.

Comparative Example 6
Preparation of the Complex Solution

A complex solution of metallocene was prepared by adding 20.9 mg of rac-ethylene-bis(indenyl) zirconimumdichloride into 20 ml moisture and oxygen free toluene. The final solution had a concentration of 2.5 µmol/ml (1.045 mg/ml). To form the metallocene/MAO complex, 1.0 ml of the metallocene compound solution was added into 10 ml of additional toluene containing 0.09 ml of 30 w-% MAO. The final Al/Zr-ratio was 100.

Test Polymerization

A test polymerization was carried out in a 3-liter Büchi autoclave in n-pentane at 70° C. The ethylene partial pressure was 5 bar and the total pressure was 8.6 bar. Into the reactor, 2.5 ml of the previously prepared complex solution was fed. The total amount of metallocene compound was 0.63 µmnol (0.26 mg) and the Al/Zr-ratio was 100. After 30 min, the polymerization reaction was stopped by closing the ethylene feed and releasing the overpressure from the reactor. The yield of polymer was 9 g giving a total catalyst activity of 302 kgPE/g*Zr*h.

Example 7'
Preparation of the Complex Solution

A complex solution of metallocene was prepared by adding 20 mg of rac-ethylene-bis(2-tert-butyldimethylsiloxyindenyl)zirconiumdichloride into 11.5 ml moisture and oxygen free toluene. The final solution had a concentration of 2.54 µmol/ml (1.74 mg/ml).

Test Polymerization

A test polymerization was carried out in a 3-liter Büchi autoclave in n-pentane at 70° C. The ethylene partial pressure was 5 bar and the total pressure was 8.2 bar. Into the reactor, 1 ml of the previously prepared complex solution was fed together with 1.1 ml of MMAO-4. MMAO-4 is methyl aluminoxane containing 30% by weight of isobutyl groups. The total amount of metallocene compound was 2.54 µmol (1.74 mg) and the Al/Zr-ratio was 1000. After 12 min, the polymerization vessel was full of polymer and the reaction was stopped by closing the ethylene feed and releasing the overpressure from the reactor. The yield of polymer was 110 g giving a total catalyst activity of 2357 kgPE/g*Zr*h.

Comparative Example 8
Preparation of the Metallocene Solution

A solution of metallocene was prepared by adding 10 mg (1.2)-ethylene-bis(indenyl)zirconiumdichloride into 10 ml moisture and oxygen free toluene. The final solution had a concentration of 2.75 µmol/ml (1 mg/ml).

Test Polymerization

A test polymerization was carried out in a 3-liter Büchi autoclave in isobutane at 71° C. The ethylene partial pressure was 5 bar and the total pressure was 15.8 bar. Into the reactor, 1.15 ml of the previously prepared complex solution and 2.64 ml HIBAO (HIBAO=hexaisobutyl aluminoxane) 20% in hexane was added. The Al/Zr-ratio was 1055. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the over pressure was released from the reactor. The yield of polymer was 18 g and the total catalyst activity was 64 kgPE/g*Zr*h.

Comparative Example 9
Preparation of the Metallocene Solution

As in comparative example 8

Test Polymerization

A test polymerization was carried out in a 3-liter Büchi autoclave in isobutane at 71° C. The ethylene partial pressure was 5 bar and the total pressure was 15.8 bar. Into the reactor, 1.15 ml of the previously prepared complex solution and 1.32 ml of HIBAO 20% in hexane was added. The Al/Zr-ratio was 527. A metal cylinder was tightened to the reactor. The volume of isobutane was 1.8 liters. Half of the isobutane was fed into the reactor beforehand. The other half of isobutane was used to wash the catalyst from the metal cylinder into the reactor when streaming through the cylinder. The reaction time was 60 minutes. After that the ethylene feed valve was closed and the overpressure was released from the reactor. The yield of polymer was 1 g and the total catalyst activity was 8 kgPE/g*Zr*h.

Comparative Example 10
Preparation of the Metallocene Solution

As in comparative example 8

Test Polymerization

A test polymerization was carried out in a 3-liter Büchi autoclave in isobutane at 71° C. The ethylene partial pressure was 5 bar and the total pressure was 15.8 bar. Into the reactor, 1.15 ml of the previously prepared complex solution and 0.66 ml HIBAO 20% in hexane was added. The Al/Zr-ratio was 264. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 3 g and the total catalyst was activity 24 kgPE/g*Zr*h.

Comparative Example 11
Preparation of the Metallocene Solution

A solution of metallocene was prepared by adding 10 mg of n-butyldicyclopentadienylzirconium dichloride into 10 ml moisture and oxygen free toluene. The final solution had a conceration 2.47 μmol/ml (1 mg/ml).
Test Polymerization A test polymerization was carried out in a 3-liter Büchi autoclave in isobutane at 71° C. The ethylene partial pressure was 5 bar and the total pressure was 15.5 bar. Into the reactor, 1.0 ml of the previously prepared complex solution and 2.26 ml of 20% HIBAO in cyclohexane was fed. The Al/Zr-ratio was 1006. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 13 g and the total catalyst activity was 106 kgPE/g*Zr*h.

Comparative Example 12
Preparation of the Metallocene Solution

As in comparative example 11
Test Polymerization

A test polymenrzation was carried out in a 3-liter Büchi autoclave in isobutane at 71° C. The ethylene partial pressure was 5 bar and the total pressure was 15.6 bar. Into the reactor, 1.0 ml of the previously prepared complex solution and 1.13 ml of 20% HIBAO in hexane was fed. The Al/Zr-ratio was 503. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 6 g and the total catalyst activity was 53 kgPE/g*Zr*h.

Comparative Example 13
Preparation of the Metallocene Solution

As in comparative example 11
Test Polymerization

A test polymerization was carried out in a 3-liter Büchi autoclave in isobutane at 71° C. The ethylene partial pressure was 5 bar and the total pressure was 15.5 bar. Into the reactor, 1.0 ml of the previously prepared complex solution and 0.57 ml of HIBAO 20% in cyclohexane was fed. The Al/Zr-ratio was 254. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 6 g and the total catalyst activity was 53 kgPE/g*Zr*h.

Comparative Example 14
Preparation of the Metallocene Solution

As in comparative example 11
Test Polymerization

A test polymerization was carried out in a 3-liter Büchi autoclave in isobutane at 71° C. The ethylene partial pressure was 5 bar and the total pressure was 15.8 bar. Into the reactor, 1.0 ml of the previously prepared complex solution and 1.3 ml TIBAO (TIBAO=tetraisobutyl aluminoxane) 30% in cyclohexane was fed. The Al/Zr-ratio was 897. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 3 g and the total catalyst activity was 25 kgPE/g*Zr*h.

Comparative Example 15
Preparation of the Metallocene Solution

As in comparative example 11
Test Polymerization

A test polymerization was carried out in a 3-liter Büchi autoclave in isobutane at 71° C. The ethylene partial pressure was 5 bar and the total pressure was 15.8 bar. Into the reactor, 1.0 ml of the previously prepared complex solution and 0.5 ml of 30% TIBAO in cyclohexane was fed. The Al/Zr-ratio was 345. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 3 g and the total catalyst activity was 25 kgPE/g*Zr*h.

EXAMPLES

Example 1
Preparation of the Complex Solution

A complex solution of metallocene/HIBAO was prepared by adding 20 mg of rac-ethylene-bis(2-tert-butyldimethylsiloxyindenyl)zirconiumdichloride into 11.5 ml moisture and oxygen free toluene. The final solution had a concentration of 2.54 μmol/ml (1.74 mg/ml).
Test Polymerization A test polymerization was carried out in a 3-liter Büchi autoclave in n-pentane at 70° C. The ethylene partial pressure was 5 bar and the total pressure was 8.2 bar. Into the reactor. 1 ml of the previously prepared complex solution was fed together with 2 ml of HIBAO. The total amount of metallocene compound was 2.54 μmol (1.74 mg) and the Al/Zr-ratio was 1000. After 20 min, the polymerization was stopped by closing the ethylene feed and releasing the overpressure from the reactor. The yield of polymer was 60 g giving a total catalyst activity of 777 kgPE/g*Zr*h.

Example 2
Preparation of the Complex Solution
As in example 1
Test Polymerization A test polymerization was carried out in a 3-liter Büchi autoclave in n-pentane at 70° C. The ethylene partial pressure was 5 bar and the total pressure was 8.2 bar. Into the reactor, 1.0 ml of the previously prepared complex solution was fed together with 1 ml of HIBAO. The total amount of metallocene compound was 2.54 µmol (1.74 mg) and the Al/Zr-ratio was 500. After 30 min the polymerization reaction was stopped by closing the ethylene feed and releasing the overpressure from the reactor. The yield of polymer was 62 g giving a total catalyst activity of 535 kgPE/g*Zr*h.

Example 3 (repeated example 2)
Preparation of the Complex Solution

A complex solution was prepared in situ by adding 10 mg of rac-ethylene-bis(2-tert-butyldimethylsiloxyindenyl)zirconiumdichloride directly into 6 ml of HIBAO solution. The final solution had a concentration of 2.4 µmol/ml (1.67 mg/ml) and the Al/Zr-ratio is 500.
Test Polymerization A test polymerization was carried out in a 3-liter Büchi autoclave in n-pentane at 70° C. The ethylene partial pressure was 5 bar and the total pressure was 8.4 bar. Into the reactor, 1.0 ml of the previously prepared complex solution was fed. The total amount of metallocene compound was 2.4 pmol (1.65 mg) and the Al/Zr-ratio was 500. After 28 min, the polymerization was stopped by closing the ethylene feed and releasing the overpressure from the reactor. The yield of polymer was 63 g giving a total catalyst activity of 562 kgPE/g*Zr*h.

Example 4
Preparation of the Metallocene Solution

A solution of the metallocene was prepared by adding 24 mg of rac-ethylene-bis(2-tert-butyldimethylsiloxyindenyl)zirconiumdichloride into 12 ml moisture and oxygen free toluene. The final solution had a concentration of 2.95 µmol/ml (2.0 mg/ml).
Test Polymerization A test polymerization was carried out in a 3-liter Büchi autoclave in isobutane at 71° C. The ethylene partial pressure was 5 bar and the total pressure was 15.3 bar. Into the reactor, 1.0 ml of the previously prepared complex solution and 1.0 ml of 20% HIBAO in hexane was added. The Al/Zr-ratio was 373. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the over pressure was released from the reactor. The yield of polymer was 67 g and the total catalyst activity was 494 kgPE/g*Zr*h.

Example 5
Preparation of the Complex Solution

A complex solution was prepared in situ by adding 10 mg of rac-ethylene-bis(2-tert-butyldimethylsiloxyindenyl)zirconiumdichloride directly into 3 ml of a HIBAO solution. The final solution had a concentration of 2.4 µmol/ml (1.67 mg/ml) and the Al/Zr-ratio was 250.
Test Polymerization A test polymerization was carried out in a 3-liter Büchi autoclave in n-pentane at 70° C. The ethylene partial pressure was 5 bar and the total pressure was 8.2 bar. Into the reactor, 2.0 ml of the previously prepared complex solution was fed. The total amount of metallocene compound was 4.8 µmol (3.3 mg) and Al/Zr-ratio was 250. After 30 min, the polymerization was stopped by closing the ethylene feed and releasing the overpressure from the reactor. The yield of polymer was 40 g and the total catalyst activity was 180 kgPE/g*Zr*h.

Example 6
Preparation of the Complex Solution

A complex solution was prepared in situ by adding 10 mg of rac-ethylene-bis(2-tert-butyldimethylsiloxyindenyl)zirconiumdichloride directly into 3 ml of a HIBAO solution. The final solution had a concentration of 2.4 µmol/ml (1.67 mg/ml) and the Al/Zr-ratio was 250.
Test Polymerization A test polymerization was carried out in a 3-liter Büchi autoclave in n-pentane at 70° C. The ethylene partial pressure was 5 bar and the total pressure was 8.2 bar. Into the reactor, 1.0 ml of the previously prepared complex solution was fed. The total amount of metallocene compound was 2.4 µmol (1.65 mg) and Al/Zr-ratio was 250. After 30 min, the polymerization was stopped by closing the ethylene feed and releasing the overpressure from the reactor. The yield of polymer was 20 g and the total catalyst activity was 175 kgPE/g*Zr*h.

Example 7
Preparation of the Metallocene Solution

A solution of the metallocene was prepared by adding 15 mg of rac-ethylene-bis(2-tert-butyldimethylsiloxyindenyl)zirconiumdichloride into 10 ml moisture and oxygen free toluene. The final solution had a concentration of 2.35 µmol/ml (1.5 mg/ml).
Test Polymerization A test polymerization was carried out in a 3-liter Büchi autoclave in isobutane at 71° C. The ethylene partial pressure was 5 bar and the total pressure was 15.5 bar. Into the reactor, 1.0 ml of the previously prepared complex solution and 1.0 ml of 20% HIBAO in hexane was added. The Al/Zr-ratio was 468. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the over pressure was released from the reactor. The yield of polymer was 118 g and the total catalyst activity was 1100 kgPE/g*Zr*h.

Example 8
Preparation of the Metallocene Solution
As in example 7
Test Polymerization A test polymerization was carried out in a 3-liter Büchi autoclave in isobutane at 71° C. The ethylene partial pressure was 5 bar and the total pressure was 15.2 bar. Into the reactor, 1.0 ml of the previously prepared complex solution and 0.54 ml of 20% HIBAO in hexane was added. The Al/Zr-ratio was 252. A metal cylinder was tightened to the reactor. The volume of isobutane was 1.8 liters. Half of the isobutane was fed into the reactor beforehand. The other half of isobutane was used to wash the catalyst from the metal cylinder into the reactor when streaming throug the cylinder. The reaction time was 60 minutes. After that the ethylene feed valve was closed and the over pressure was released from the reactor. The yield of polymer was 88 g and the total catalyst activity was 704 kgPE/g*Zr*h.

Example 9
Preparation of the Complex Solution

A complex solution wvas prepared in situ by adding 5 mg of rac-ethylene-bis(2-tert-butyldimethylsiloxyindenyl) zirconiumdichloride directly into 6.0 ml of a TIBAO solution. The final solution had a concentration of 1.2 $\mu$mol/ml (0.83 mg/ml) and the Al/Zr-ratio was 1000.

Test Polymerization

A test polymerization was carried out in a 3-liter Büchi autoclave in n-pentane at 70° C. The ethylene partial pressure was 5 bar and the total pressure was 8.3 bar. Into the reactor, 1.0 ml of the previously prepared complex solution was fed. The total amount of metailocene compound was 1.2 $\mu$mol (0,83 mg) and the Al/Zr-ratio was 1000. After 40 min, the polymerization reaction was stopped by closing the ethylene feed and releasing the overpressure from the reactor. The yield of polymer was 22 g giving a total catalyst activity 296 kgPE/g*Zr*h.

Example 10
Preparation of the Complex Solution

As in example 1

Test Polymerization

A test polymerization was carried out in a 3-liter Büchi autoclave in n-pentane at 70° C. The ethylene partial pressure was 5 bar and the total pressure was 9.2 bar. Into the reactor, 1 ml of the previously prepared complex solution was fed together with 1 ml of TIBAO. The total amount of metallocene compound was 2.54 $\mu$mol (1.74 mg/ml) and the Al/Zr-ratio was 500. After 60 min, the polymerization was stopped by closing the ethylene feed and releasing the overpressure from the reactor. The yield of polymer was 25 g giving a total catalyst activity 110 kgPE/g*Zr*h.

Example 11
Preparation of the Complex Solution

A complex solution was prepared in situ by adding 20 mg of rac-ethylene-bis(2-tert-butyldimethylsiloeneadenyl) zironiumdichloride directly into 12.0 ml of a TIBAO solution. The final solution had a concentration of 2.54 $\mu$mol/ml (1.74 mg/ml) and the Al/Zr-ratio was 500.

Test Polymerization

A test polymerization was carried out in a 3-liter Büchi autoclave in n-pentane at 70° C. The ethylene partial pressure was 5 bar and the total pressure was 8.1 bar. Into the reactor, 1.0 ml of the previously prepared complex solution was fed. The total amount of metallocene compound was 2.4 $\mu$mol (1.67 mg) and the Al/Zr-ratio was 500. After 30 min, the polymerization was stopped by closing the ethylene feed and releasing the overpressure from the reactor. The yield of polymer was 12 g giving a total catalyst activity 107 kgPE/g*Zr*h.

Example 12
Preparation of the Complex Solution

A complex solution was prepared in situ by adding 10 mg of rac-ethylene-bis(2-tert-butyldimethylsiloxyindenyl) zirconiumdichloride directly into 12.0 ml of a TIBAO solution. The final solution had a concentration of 4.8 $\mu$mol/ml (3.3 mg/ml) and the Al/Zr-ratio was 250.

Test Polymerization

A test polymerization was carried out in a 3-liter Büchi autoclave in n-pentane at 70° C. The ethylene partial pressure was 5 bar and the total pressure was 8 bar. Into the reactor, 0.5 ml of the previously prepared complex solution was fed. The total amount of metallocene compound was 2.4 $\mu$mol (1.67 mg) and the Al/Zr-ratio was 250. After 60 min, the polymerization was stopped by closing the ethylene feed and releasing the overpressure from the reactor. The yield of polymer was 8 g giving a total catalyst activity 36 kgPE/g*Zr*h.

Example 13
Preparation of the Metallocene Solution

As in example 7

Test Polymerization

A test polymerization was carried out in a 3-liter Büchi autoclave in isobutane at 71° C. The ethylene partial pressure was 5 bar and the total pressure was 15.2 bar. Into the reactor, 1.0 ml of the previously prepared complex solution and 1.23 ml of 30% TIBAO in cyclohexane was added. The Al/Zr-ratio was 892. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming through the cylinder. The reaction time was 30 minutes. After that the ethylene feed valve was closed and the over pressure was released from the reactor. The yield of polymer was 60 g and the total catalyst activity was 560 kgPE/g*Zr*h.

Example 14
Preparation of the Metallocene Solution

As in example 7

Test Polymerization

A test polymerization was carried out in a 3-liter Büchi autoclave in isobutane at 71° C. The ethylene partial pressure was 5 bar and the total pressure was 15.2 bar. Into the reactor, 1.0 ml of the previously prepared complex solution and 0.65 ml of 30% of TIBAO in cyclohexane was added. The Al/Zr-ratio was 500. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 30 minutes. After that the ethylene feed valve was closed and the over pressure was released from the reactor. The yield of polymer was 26 g and the total catalyst activity was 260 kgPE/g*Zr*h.

Example 15
Preparation of the Metallocene Solution

A solution of metallocene was prepared by adding 16 mg of rac-ethylene-bis(2-tert-butyldimethylsiloxyindenyl) zirconiumdichloride into 10 ml of moisture and oxygen free toluene. The final solution had a concentration of 2.47 $\mu$mol/ml (1.6 mg/ml).

Test Polymerization

A test polymerization was carried out in a 3-liter Büchi autoclave in isobutane at 71° C. The ethylene partial pressure was 5 bar and the total pressure was 15.4 bar. Into a metal cylinder, 1.0 ml of the previously prepared complex solution and 1.0 ml of 20% HIBAO in hexane was fed. The Al/Zr-ratio was 500. A metal cylinder was tightened to the reactor. The volume of isobutane was 1.8 liters. Half of the isobutane was fed into the reactor beforehand. The other half of the isobutane was used to wash the catalyst from the metal cylinder into the reactor when streaming throug the cylinder. The reaction time was 60 minutes. After that the ethylene feed valve was closed and the overpressure was released from the reactor. The yield of polymer was 78 g and the total catalyst activity was 692 kgPE/g*Zr*h.

Example 16
Preparation of the Complex Solution
As in example 1
Test Polymerization
A test polymerization was carried out in a 3-liter Büchi autoclave in n-pentane at 70° C. The ethylene partial pressure was 5 bar and the total pressure was 8.7 bar. Into the reactor, 1.0 ml of the previously prepared complex solution was fed together with 1.2 ml of EAO (EAO=ethylaluninoxane). The total amount of metallocene compound was 2.54 μmol (1.74 mg) and the Al/Zr-ratio was 1000. The reaction time was 60 minutes. After 60 min, the polymerization was stopped by closing the ethylene feed and releasing the overpressure from the reactor. The yield of polymer was 40 g giving a total catalyst activity 174 kgPE/g*Zr*h.

Example 17
Preparation of the Complex Solution
As in example 1
Test Polymerization
A test polymerization was carried out in a 3-liter Büchi autoclave in n-pentane at 70° C. The ethylene partial pressure was 5 bar and the total pressure was 9 bar. Into the reactor, 1.0 ml of the previously prepared complex solution was fed together with 0.6 ml of EAO. The total amount of metallocene compound was 2.54 μmol (1.74 mg) and the Al/Zr-ratio was 500. After 60 min, the polymerization was stopped by closing the ethylene feed and releasing the overpressure from the reactor. The yield of polymer was 35 g giving a total catalyst activity 153 kgPE/g*Zr*h.

Example 18
Preparation of the Metallocene Solution
A solution of the metallocene was prepared by adding 17 mg of rac-ethylene-bis(3-tert-butyldimethylsiloxyindenyl)zirconiumdichloride into 10 ml of moisture and oxygen free toluene. The final solution had a concentration of 2.5 μmol/ml (1.7 mg/ml).
Test Polymerization
A test polymerization was carried out in a 3-liter Büchi autoclave in isobutane at 71° C. The ethylene partial pressure was 5 bar and the total pressure was 15.5 bar. Into a metal cylinder, 1.0 ml of the previously prepared complex solution and 1.0 ml of 20% HIBAO in hexane was fed. The Al/Zr-ratio was 500. A metal cylinder was tightened to the reactor. The volume of isobutane was 1.8 liters. Half of the isobutane was fed into the reactor beforehand. The other half of the isobutane was used to wash the catalyst from the metal cylinder into the reactor when passing the cylinder. The reaction time was 60 minutes. After that the ethylene feed valve was closed and the overpressure was released from the reactor. The yield of polymer was 126 g and the total catalyst activity was 552 kgPE/g*Zr*h.

Example 19
Preparation of the Metallocene Solution
As in example 18
Test Polymerization
A test polymerization was carried out in a 3-liter Büchi autoclave in isobutane at 71° C. The ethylene partial pressure was 5 bar and the total pressure was 15.8 bar. Into a metal cylinder, 1.0 ml of the previously prepared complex solution and 0.5 ml of 20% HIBAO in hexane was fed. The Al/Zr-ratio was 250. A metal cylinder was tightened to the reactor. The volume of isobutane was 1.8 liters. Half of the isobutane was fed into the reactor beforehand. The other half of the isobutane was used to wash the catalyst from the metal cylinder into the reactor when passing the cylinder. The reaction time was 60 minutes. After that the ethylene feed valve was closed and the overpressure was released from the reactor. The yield of polymer was 90 g and the total catalyst activity was 395 kgPE/g*Zr*h.

TABLE 1

Conditions in homopolymerization are $P_{C2}$ = 5 bar, temperature 70° C. in pentane, compound 1 = rac-ethylene-bis(2-tert-butyldimethylsiloxyindenyl)zirconiumdichloride, compound 2 = rac-ethylene-bis(2-tert-butyldimethylsiloxyindenyl)zirconiumdimethyl compound 3 = rac-ethylene-bis(2-tert-butyldimethylsiloxytetrahydroindenyl)zirconiumdichloride, compound 4 = rac-ethylene-bis(3-tert-butyldimethylsiloxyindenyl)zirconiumdichloride, REF. Compound 1 = ethylene-bis(indenyl)zirconiumdichloride, REF. Compound 2 = n-butylcyclopentadienyl zirconiumdichloride MAO = 30 w-% methylalumoxane in toluene, HIBAO = heksaisobutylalumoxane, TIBAO = tetraisobutylalumoxane, EAO = ethylalumoxane, MMAO = modified metylalumoxane containing 10% isobutyl groups.

| Metallocene | Cocatalyst | Al/Zr | time min | Amount of comp. | Yield g | Activity kgPE/g · Zr · h | $M_v$ | D | Example |
|---|---|---|---|---|---|---|---|---|---|
| Compound 1 | MAO | 500 | 30 | 0.65 μmol | 73 | 2540 | 114000 | 2.8 | Comparative example 1 |
| " | " | 200 | 30 | 2.54 μmol | 120 | 1036 | 238000 | 4.0 | Comparative example 2 |
| " | " | 100 | 30 | 0.63 μmol | 12 | 406 | | | Comparative example 3 |
| REF. Compound 1 | " | 500 | 30 | 0.65 μmol | 25 | 842 | 124000 | 2.8 | Comparative example 4 |
| " | " | 200 | 30 | 0.65 μmol | 27 | 910 | 128000 | 3.4 | Comparative example 5 |
| " | " | 100 | 30 | 0.65 μmol | 9 | 302 | 101000 | 2.9 | Comparative example 6 |
| Compound 1 | MMAO-4 | 1000 | 12 | 2.54 μmol | 110 | 2357 | | | Comparative example 7 |
| REF. Compound 1 | HIBAO | 1000 | 60 | 2.75 μmol | 18 | 64 | | | Comparative example 8 |
| " | " | 500 | 60 | 2.75 μmol | 1 | 8 | | | Comparative |

TABLE 1-continued

Conditions in homopolymerization are $P_{C2}$ = 5 bar, temperature 70° C. in pentane, compound 1 = rac-ethylene-bis(2-tert-butyldimethylsiloxyindenyl)zirconiumdichloride, compound 2 = rac-ethylene-bis(2-tert-butyldimethylsiloxyindenyl)zirconiumdimethyl compound 3 = rac-ethylene-bis(2-tert-butyldimethylsiloxytetrahydroindenyl)zirconiumdichloride, compound 4 = rac-ethylene-bis(3-tert-butyldimethylsiloxyindenyl)zirconiumdichloride, REF. Compound 1 = ethylene-bis(indenyl)zirconiumdichloride, REF. Compound 2 = n-butylcyclopentadienyl zirconiumdichloride MAO = 30 w-% methylalumoxane in toluene, HIBAO = heksaisobutylalumoxane, TIBAO = tetraisobutylalumoxane, EAO = ethylalumoxane, MMAO = modified metylalumoxane containing 10% isobutyl groups.

| Metallocene | Cocatalyst | Al/Zr | time min | Amount of comp. | Yield g | Activity kgPE/g · Zr · h | $M_v$ | D | Example |
|---|---|---|---|---|---|---|---|---|---|
| | | | | | | | | | example 9 |
| " | " | 250 | 60 | 2.75 μmol | 3 | 24 | | | Comparative example 10 |
| Compound 1 | HIBAO | 1000 | 20 | 2.54 μmol | 60 | 777 | | | Example 1 |
| " | " | 500 | 30 | 2.54 μmol | 62 | 535 | 298000 | 6.9 | Example 2 |
| " | " | 500 | 28 | 2.4 μmol | 63 | 562 | | | Example 3 |
| " | " | 370 | 30 | 2.95 μmol | 67 | 494 | | | Example 4 |
| " | " | 250 | 30 | 4.8 μmol | 40 | 180 | | | Example 5 |
| " | " | 250 | 30 | 2.4 μmol | 20 | 175 | | | Example 6 |
| Compound 2 | HIBAO | 470 | 30 | 2.35 μmol | 118 | 1100 | | | Example 7 |
| " | " | 250 | 30 | 2.35 μmol | 88 | 704 | | | Example 8 |
| Compound 4 | HIBAO | 500 | 60 | 2.50 μmol | 126 | 552 | | | Example 18 |
| " | " | 250 | 60 | " | 90 | 395 | | | Example 19 |
| REF. compound 2 | HIBAO | 1000 | 60 | 2.47 μmol | 13 | 106 | | | Comparative example 11 |
| " | " | 500 | 60 | " | 6 | 53 | | | Comparative example 12 |
| " | " | 250 | 60 | " | 6 | 53 | | | Comparative example 13 |
| Compound 1 | TIBAO | 1000 | 40 | 1.2 μmol | 22 | 296 | | | Example 9 |
| " | " | 500 | 60 | 2.54 μmol | 25 | 110 | | | Example 10 |
| " | " | 500 | 30 | 2.4 μmol | 12 | 107 | | | Example 11 |
| " | " | 250 | 60 | " | 8 | 36 | | | Example 12 |
| Compound 2 | TIBAO | 898 | 30 | 2.35 μmol | 60 | 560 | | | Example 13 |
| " | " | 500 | 30 | " | 26 | 260 | | | Example 14 |
| Compound 3 | HIBAO | 500 | 60 | 2.47 μmol | 78 | 690 | | | Example 15 |
| REF. Compound 2 | TIBAO | 890 | 60 | 2.47 μmol | 3 | 25 | | | Comparative example 14 |
| " | " | 345 | 60 | 2.47 μmol | 3 | 25 | | | Comparative example 15 |
| Compound 1 | EAO | 1000 | 60 | 2.54 μmol | 40 | 175 | 116000 | 3.5 | Example 16 |
| " | " | 500 | 60 | " | 35 | 153 | 159000 | 4.5 | Example 17 |
| " | HIBAO | 500 | 60 | — | 126 | 552 | | | Example 18 |
| " | " | 250 | 60 | — | 90 | 395 | | | Example 19 | rac-ethylene-bis(2-tert-butylmethylsiloxyidenyl) zirconiumdichloride (compound 1)

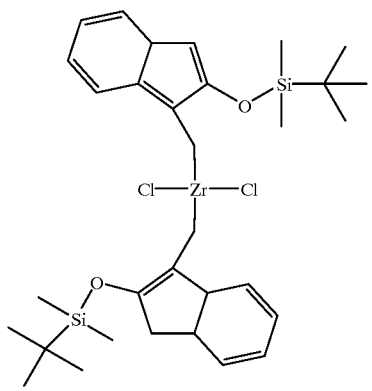

rac-ethylene-bis(2-tert-butylmethylsiloxyindenyl) zirconiumdimethyl (compound 2)

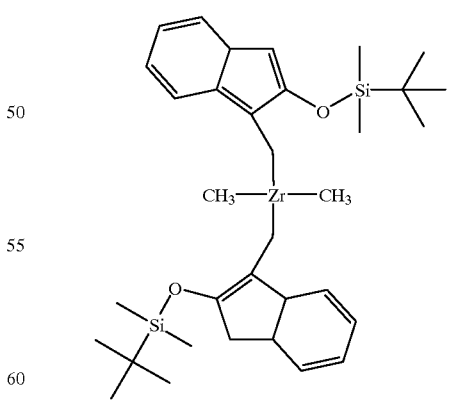

rac-ethylene-bis(2-tert-butyhmethylsiloxytetrahydroindenyl)zirconiumdichloride (compound 3)

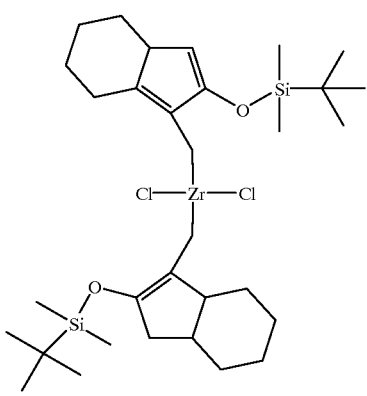

rac-ethylene-bis(2-tert-butylmethylsiloxyindenyl) zirconiumdichloride (compound 4)

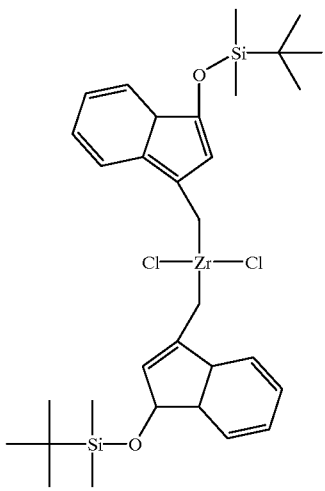

REF. compound 1=ethylene-bis(indenyl) zirconiumdichloride

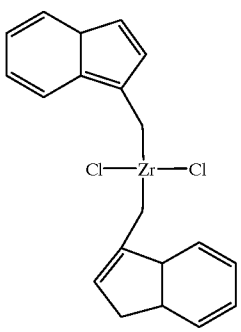

REF. compound 2=n-butylcyclopentadienylzirconiuidlchloride

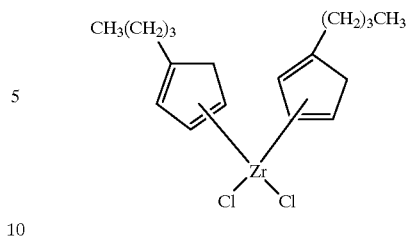

Some conclusions from the examples of this application
1. General Behaviour of rac-ethylene-bis(2-tert-butyldimethylsiloxyindenyl)zirconiumdichloride/MAO complex Comparative examples 1, 2, 3 illustrate the genereal behaviour of siloxy substituted cyclopentadienyl compounds when activated by conventional methylaluminoxane with different Al/Zr-ratios.

2. General Behaviour of ethylene-bis(indenyl) zirconiumdichloride/MAO Complex

Comparative examples 4, 5, 6 illustrate the general polymerization behaviour of non-siloxysubstituted cyclopentadienyl compounds when MAO is used with different Al/Zr-ratios.

3. Polymerization with Sligthly Modified MAO

Comparative example 7 indicates that addition of isobutyl groups into MAO does not affect the activity of siloxy substituted compound. This experiment should be compared to comparative example 1, where pure MAO was used. No significant change in catalyst performance can be seen.

4. Polymerization of Siloxy Substituated Compounds with Hexaisobutylaluminoxane (=HIBAO)

Examples 1–6 illustrate the general behaviour of new non-MAO based coactivator system with siloxy substituted compounds. Al/Zr-ratio will clearly affect onto catalyst activity. Example 7 reflects the use of metallocene compounds having methyls at the metal.

5. Effect of Precontact of Siloxy Substituted Metallocene and HIBAO

In example 2 metallocene and HIBAO were fed separately into reactor. In example 3, metallocene and HIBAO were mixed before going into the reactor. No clear difference can be seen in activity. Conclusion: metallocene and coactivator can be fed together or separately into the reactor.

6. Effect of Concentration

Examples 5 and 6 indicate that concentration of metallocene compound can be varied quite much without affecting the catalyst activity.

7. Polymerization of Siloxy Substituted Compounds with Tetraisobutylaluminoxane (=TIBAO)

Examples 9, 10, 11, 12 will describe the use of tetraisobutylaluminoxane as a coactivator with siloxy substituted metallocene compounds.

8. Polymerization of Siloxy Substituted Compounds with Ethylaluminoxane (=EAO)

Examples 16, 17 discribe the use of ethylaluminoxane as a coactivator with siloxy substituted metallocene compounds.

9. Comparison of Siloxy Substituted Compounds and Corresponding Non Substituted Compound with HIBAO as a Coactivator.

Examples 1, 2, 3 and 5 can be compared directly with comparative examples 8, 9, 10. According to these examples it is evident that siloxy substitution gives huge enhancement in catalyst activity with HIBAO. The activity increase is more than 10 fold.

10. Comparison of Methylated Siloxy Substituted Compounds and Corresponding Non Methylated Compound with HIBAO and TIBAO as a Coactivator.

Example 5 and 8 present the affect of methylation of the siloxy substituted compound. The activity increase is 4 times when HIBAO is used as a coactivator. In examples 9 and 13 coactivator is TIBAO and activity is 2 times higher with methylene substituted compound. By methylation is meant that in stead of chlorines, methyls are attached to the metal of the metallocene.

11. Position of Siloxy Substituent

Examples 5 and 18 describe the affect of position of substituent. By changing the place of substituent from the 2 position to the 3 position the activity increased 2,5 times.

What is claimed is:

1. An olefin polymerization catalyst composition comprising a metallocene and an aluminoxane or a reaction product thereof, wherein said metallocene is of formula (1).

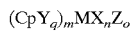
$(CpY_q)_mMX_nZ_o$      (1)

wherein Cp having the same or different structure is one of a mono- or polysubstituted, fused or non-fused, homo-, iso-, or heterocyclic cyclopentadienyl ligand, indenyl ligand, tetrahydroindenyl ligand, fluorenyl ligand, or octahydrofluorenyl ligand, Y or each same or different Y is a substituent at the cyclopentadienyl ring of said Cp ligand and is one of an —OR, —SR, —NR₂, —C(H or R)=, or —PR₂ radical, R or each same or different R being one of a substituted or unsubstituted $C_1$–$C_{16}$ hydrocarbyl group, a tertiary substituted-$C_1$–$C_8$ hydrocarbylsilyl group, a tertiary substituted-$C_1$–$C_8$ hydrocarbyloxy silyl group, a mixed $C_1$–$C_8$ hydrocarbyl and $C_1$–$C_8$ hydrocarbyloxy silyl group, a tertiary substituted-$C_1$–$C_8$ hydrocarbyl germyl group, a tertiary substituted-$C_1$–$C_8$ hydrocarbyloxy germyl group or a mixed $C_1$–$C_8$ hydrocarbyl and $C_1$–$C_8$ hydrocarbyloxy germyl group; M is a transition metal of Group 4 of the IUPAC Periodic Table and bound to the ligand or ligands Cp in at least an η⁵ bonding mode; X or each same or different X is bound to M and is one of a hydrogen, a halogen, a substituted or unsubstituted $C_1$–$C_8$ hydrocarbyl group, a $C_1$–$C_8$ O—, S—, N— or P— hydrocarbylheteroatom group or a tertiary substituted-$C_1$–$C_8$ hydrocarbyl silyl group or two X form together with M a $C_4$–$C_{20}$ metallocyclic ring structure; Z is a bridge atom or group between two Cp ligands or between one Cp ligand and the transition metal M; q is, when Cp is unbridged, 0–5 for Cp=cyclopentadienyl, 0–3 for Cp=indenyl or tetrahydroindenyl and 0–1 for Cp=fluorenyl or octahydrofluorenyl, or q is, when Cp is bridged, 0–4 for Cp=cyclopentadienyl, 0–2 for Cp=indenyl or tetrahydroindenyl and 0 or Cp=fluorenyl or octahydrofluorenyl; m is 1 or 2; the total number of Y substituents ≧1; o is 0 or 1; and n is 4-m-o, except when there is a bridge Z between two Cp ligands, in which case n is 4-m, and in that said aluminoxane contains alkyl groups containing at least two carbon atoms.

2. A composition as claimed in claim 1, wherein said composition comprises the reaction product of said aluminoxane and said metallocene.

3. A composition as claimed in claim 1, wherein said aluminoxane contains alkyl groups containing from 2 to 10 carbon atoms.

4. A composition as claimed in any one of claims 1 to 3, wherein said composition further comprises a porous particulate carrier material.

5. A composition as claimed in claim 1, wherein said metallocene is of formula (3)

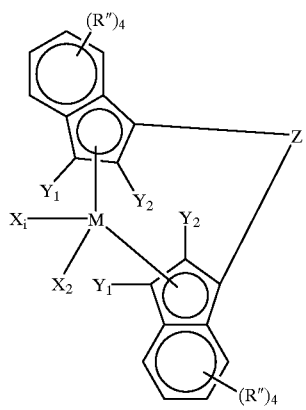
(3)

wherein each of the $Y_1$'s and $Y_2$'s is the same or different and is one of a hydrogen atom, a halogen atom, an acyl group, an acyloxy group, a substituted or unsubstituted $C_1$–$C_{10}$ hydrocarbyl group, an —OR, —SR, —NR, —C(H or R)=, or —PR₂ radical, R being one of a $C_1$–$C_{16}$ hydrocarbyl group or a tertiary substituted-$C_1$–$C_8$ hydrocarbylsilyl group, provided that at least one of the $Y_1$'s and $Y_2$'s is one of said —OR, —SR, —NR, —C(H or R)=, or —PR₂ radicals; Z is a bivalent atom or group having at least one chain atom which is one of a carbon, silicon, oxygen, sulphur, nitrogen, or phosphorus atom; each R" is the same or different ad is one of a hydrogen atom, a halogen atom, a $C_1$–$C_{10}$ hydrocarbyl group, or ring constituent or a $C_1$–$C_{10}$ hydrocarbyloxy group, M is one of Ti, Zr, or Hf; and $X_1$ and $X_2$ are the same or different and are one of a halogen atom and a $C_1$–$C_8$ hydrocarbyl group.

6. A process for the preparation of an olefin polymerization catalyst, comprising contacting a) a metallocene of the general formula (1):

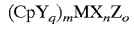
$(CpY_q)_mMX_nZ_o$      (1)

wherein Cp having the same or different structure is one of a mono- or polysubstituted, fused or non-fused, homo-, iso-, or heterocyclic cyclopentadienyl ligand, indenyl ligand, tetrahydroindenyl ligand, fluorenyl ligand, or octahydrofluorenyl ligand, Y or each same or different Y is a substituent at the cyclopentadienyl ring of said Cp ligand and is one of an —OR, —SR, —NR₂, —C(H or R)=, or —PR₂ radical, R or each same or different R being one of a substituted or unsubstituted $C_1$–$C_{16}$ hydrocarbyl group, a tertiary substituted-$C_1$–$C_8$ hydrocarbylsilyl group, a tertiary substituted-$C_1$–$C_8$ hydrocarbyloxy silyl group, a mixed $C_1$–$C_8$ hydrocarbyl and $C_1$–$C_8$ hydrocarbyloxy silyl group, a tertiary substituted-$C_1$–$C_8$ hydrocarbyl germyl group, a tertiary substituted-$C_1$–$C_8$ hydrocarbyloxy germyl group or a mixed $C_1$–$C_8$ hydrocarbyl and $C_1$–$C_8$ hydrocarbyloxy germyl group; M is a transition metal of Group 4 of the IUPAC Periodic Table and bound to the ligand or ligands Cp in at least an η5 bonding mode; X or each same or different X is bound to M and is one of a hydrogen, a halogen, a substituted or unsubstituted $C_1$–$C_8$ hydrocarbyl group, a $C_1$–$C_8$ O—, S—, N— or P— hydrocarbylheteroatom group or a tertiary substituted-$C_1$–$C_8$ hydrocarbyl silyl group or two X form together with M a $C_4$–$C_{20}$ metallocyclic ring structure; Z is a bridge atom or group between two Cp ligands or between one Cp ligand and the transition metal M; q is, when Cp is unbridged, 0–5 for Cp=cyclopentadienyl, 0–3 for Cp=indenyl or tetrahydroindenyl and 0–1 for Cp=fluorenyl or octahydrofluorenyl, or q is, when Cp is bridged, 0–4 for Cp=cyclopentadienyl, 0–2 for Cp=indenyl or tetrahydroindenyl and 0 or Cp=fluorenyl or octahydrofluorenyl; m is 1 or 2; the total number of Y substituents ≧1; o is 0 or 1; and n is 4-m-o, except when there is a bridge Z between two Cp ligands, in which case n is 4-m, and b) an aluminoxane of one of the following formulas (2):

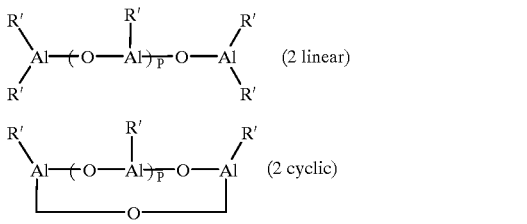

wherein each R' is the same or different and is a $C_2$–$C_{10}$ alkyl group; and p is an integer between 1 and 40, and c) an organic solvent which dissolves said metallocene and said aluminoxane or a reaction product of them, and recovering said homogeneous olefin polymerization catalyst composition.

7. The process according to claim 6, wherein Y in formula (1) is a —OR radical.

8. The process according to claim 6, wherein the group R of the radical —OR, —SR, —NR$_2$, —CR= or —PR$_2$ is a tertiary substituted $C_1$–$C_8$ hydrocarbyl silyl group.

9. The process according to claim 8, wherein R is a tertiary substituted-$C_1$–$C_8$ hydrocarbyl silyl group capable of π interaction with said O, S, N, or P atoms of Y, preferably a tertiary substituted-$C_1$–$C_8$ alkyl silyl group, wherein at least one of the $C_1$–$C_8$ alkyls is a branched $C_3$–$C_8$ alkyl preferably isopropyl, isobutyl, sec-butyl, tert-butyl, isoamyl, sec-amyl, or tert-amyl.

10. The process according to claim 6, wherein in said metallocene of the general formula (1), m is 2.

11. The process according to claim 6, wherein in said metallocene of the general formula (1), M is Zr.

12. The process according to claim 6, wherein in said metallocene of the general formula (1), X is a halogen atom and/or a $C_1$–$C_8$ hydrocarbyl group.

13. The process according to claim 6, comprising contacting said metallocene a) of the general formula (1) which has the following structural formula (3)

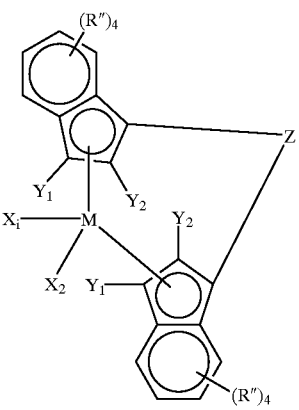

wherein each of the $Y_1$''s and $Y_2$'s is the same or different and is one of a hydrogen atom, a halogen atom, an acyl group, an acyloxy group, a substituted or unsubstituted $C_1$–$C_{10}$ hydrocarbyl group, an —OR, —SR, —NR, —C(H or R)=, or —PR$_2$ radical, R being one of a $C_1$–$C_{16}$ hydrocarbyl group or a tertiary substituted-$C_1$–$C_8$ hydrocarbylsilyl group, provided that at least one of the $Y_1$'s and $Y_2$'s is one of said —OR, —SR, —NR, —C(H or R)=, or —PR$_2$ radicals; Z is a bivalent atom or group having at least one chain atom which is one of a carbon, silicon, oxygen, sulphur, nitrogen, or phosphorus atom, preferably 1–4 carbon and/or silicon chain atoms; each R" is the same or different and is one of a hydrogen atom, a halogen atom, a $C_1$–$C_{10}$ hydrocarbyl group, or ring constituent or a $C_1$–$C_{10}$ hydrocarbyloxy group, M is one of Ti, Zr, or Hf; and $X_1$ and $X_2$ are the same or different and are one of a halogen atom and a $C_1$–$C_8$ hydrocarbyl group.

14. The process according to claim 6, wherein said metallocene of the formula (1) or (3) is ethylene-bis(2-tert-butyldimetylsiloxy-indenyl)zirconium dichloride.

15. The process according to claim 6, wherein said metallocene of the formula (1) or (3) is dissolved in a chlorinated or unchlorinated $C_4$–$C_{10}$ hydrocarbon solvent such as hexane or toluene.

16. The process according to claim 6, wherein in the formulas (2), said R' is a C3–C10 alkyl group and, independently, 2≦p≦12.

17. The process according to claim 16, wherein the aluminoxane of the formulas (2) is hexa(isobutylaluminoxane).

18. The process according to claim 6, wherein the aluminoxane of the formulas (2) is dissolved or immersed in a chlorinated or unchlorinated C4–C10 hydrocarbon solvent.

19. The process according to claim 6, wherein the molar ratio Al/M between the aluminoxane aluminium and the metallocene transition metal is between 20 and 2000.

20. The process according to claim 6, wherein the concentration of the metallocene in the catalyst composition is regulated to between 0.01 and 100 mmol/l.

21. A homogeneous olefin polymerization catalyst composition, wherein said catalyst compound has been prepared according to claim 6.

22. A method of olefin polymerization comprising contacting an olefin with a metallocene aluminoxane catalyst composition, characterized in that as said catalyst composition is used a metallocene pro-catalyst containing a ring-substituted homo- or heterocyclic cyclopentadienyl sandwich ligand as defined in claim 1 and an aluminoxane cocatalyst containing alkyl groups containing at least two carbon atoms or the reaction product thereof.

23. A method of olefin polymerization comprising contacting a metallocene containing ring-substituted homo- or heterocyclic cyclopentadienyl sandwich ligand as a procatalyst as defined in claim 1 with an aluminoxane cocatalyst containing at least two carbon atoms.

24. A composition according to claim 5, wherein said Z bivalent atom or group has 1–4 carbon or silicon chain atoms.

25. A composition according to claim 5, wherein said Z bivalent atom or group has 1–4 carbon and silicon chain atoms.

26. The process according to claim 6, wherein in said metallocene of the general formula (1), m is 2 and the two Cp ligands are bridged with each other by a bivalent atom or group Z having at least one chain atom which is one of a carbon, silicon, oxygen, sulphur, nitrogen or phosphorus atom.

27. The process according to claim 6, wherein in said metallocene of the general formula (1), wherein m is 2 and Z is ethylene or silylene.

28. The process according to claim 12, wherein said X is chlorine.

29. The process according to claim 12, wherein said X is methyl.

30. The process according to claim 6, wherein said metallocene is ethylene-bis(2-tert-butyldimethylsiloxyindentyl)zirconium dimetheyl or a tetrahydroanalog thereof.

31. The process according to claim 16, wherein said R' C3–C10 alkyl group is an isopropyl, isobutyl, sec-butyl, tert-butyl, isoamyl, sec-amyl, or tert-amyl group.

32. The process according to claim 16 or 31, wherein said p is $\leq 4$ and $\leq 8$.

33. The process according to claim 18, wherein said hydrocarbon solvent is hexane or toluene.

34. The process according to claim 19, wherein said molar ratio Al/M is between 50 and 1500.

35. The process according to claim 19, wherein said molar ratio Al/M is between 100 and 1200.

36. The process according to claim 6, wherein the concentration of the metallocene in the catalyst composition is regulated to between 0.5 and 10 mmol/l.

37. The process according to claim 6, wherein the concentration of the metallocene in the catalyst composition is regulated to between 1 and 5 mmol/l.

38. The process according to claim 16, wherein the aluminoxane of formulas (2) is tetra(isobutylaluminoxane).

* * * * *